United States Patent [19]

Iyehara et al.

[11] 4,451,846

[45] May 29, 1984

[54] COLOR IMAGE DISPLAY APPARATUS

[75] Inventors: Sadahiro Iyehara, Suita; Mitsuya Masuda, Kyoto; Shizuo Inohara, Toyonaka; Minoru Ueda, Takatsuki; Keisuke Yamamoto, Ibaraki, all of Japan

[73] Assignee: Matsushita Electric Industrial Co., Ltd., Kadoma, Japan

[21] Appl. No.: 343,751

[22] Filed: Jan. 28, 1982

[30] Foreign Application Priority Data

Feb. 10, 1981 [JP] Japan ................................ 56-18781
Feb. 13, 1981 [JP] Japan ................................ 56-20618

[51] Int. Cl.³ ......................... H04N 9/12; H04N 9/16

[52] U.S. Cl. ...................................... 358/56; 358/230; 358/242; 315/366; 340/781

[58] Field of Search ............... 358/230, 231, 241, 242, 358/59, 56, 64, 65, 66, 67, 68; 340/704, 713, 714, 752, 772, 781, 783, 793, 794; 315/13 R, 13 C, 13 CG, 366

[56] References Cited

U.S. PATENT DOCUMENTS 3,800,186 3/1974 Yamane .............................. 340/772
3,992,644 11/1976 Chodil .................................. 358/56
4,158,210 6/1979 Watanabe ............................ 358/56
4,170,771 10/1979 Bly .................................... 358/241
4,170,772 10/1979 Bly ...................................... 358/59

*Primary Examiner*—Tommy P. Chin
*Attorney, Agent, or Firm*—Cushman, Darby & Cushman

[57] ABSTRACT

A flat type color display apparatus includes a phosphor screen and 15 horizontal line cathodes activated in turn from the top one to the bottom one. An electron beam control means and a beam deflection means are provided. Each horizontal line cathode emits a horizontal sheet-shaped electron beam which is vertically deflected in 16 steps, and is divided into 320 rod-shaped electron beams by 320 vertically oblong slits and individually controlled of its intensity by 320 beam-control electrodes. The rod-shaped electron beams are horizontally deflected each selectively impinging R, G and B vertical phosphor stripes in turn. In the operation circuit, R, G and B video signals are sampled and held in R, G and B parts of 320 sample-hold circuits, and stored at one time in 320 memories for respective colors, and time sharingly applied to the respective beam-control electrodes. A color video image is thereby displayed of 240 lines each having 320 picture elements.

9 Claims, 7 Drawing Figures

COLOR IMAGE DISPLAY APPARATUS

BACKGROUND OF THE INVENTION

1. Field of the Invention

The present invention relates to a color image display apparatus comprising a flat displaying apparatus with a number of (for example fifteen) line cathodes.

More particularly, the present invention concerns a color image display apparatus for displaying a color image by means of a color phosphor screen and a plural number of parallel disposed line cathodes.

2. Description of the Prior Art

Hitherto, for a color image display apparatus for a color television set, a color cathode-ray tube having three electron guns or a single electron gun set in a neck part of a bulky cone shaped vacuum enclosure has been used for a long time. The shortcoming of the conventional color cathode ray tube is a large depth in comparison with the size of the screen face, prevention providing a flat and compact television set. Though EL display apparatus, plasma display apparatus or liquid crystal display apparatus has been developed, these are not sufficiently usable for practical use because they have problems in brightness, contrast or color displaying.

SUMMARY OF THE INVENTION

Therefore, the present invention is intended to provide a color television set with a flat shaped display apparatus.

The present invention enables displaying color image of a high quality without unevenness of brightness or color.

The color display apparatus in accordance with the present invention comprises:

a color phosphor screen comprising a first predetermined number of horizontally divided sections each comprising a set of regions of primary color phosphors, an electron beam source for in-turn emitting a second predetermined number of horizontal rows of electron beams, each row having the first predetermined number of electron beams, producing one horizontal line on the color screen, a horizontal deflection means for selective impingements of the electron beams on the regions in turn selected corresponding kinds of primary color phosphors at one time, in turn changing colors of said horizontally divided sections, a vertical deflection means for vertically deflecting the electron beams in such a manner that electron beams of a horizontal row impinges the phosphor screen in one vertically divided segment which is corresponding to the one horizontal row, thereby vertically moving the one horizontal line in the vertically divided segment, an electron beam control means for simultaneous controlling of intensities of respective electron beams responding to color video signal for the selected kind of primary color to produce a line-at-a-time displaying of color video picture, and a flat shaped vacuum enclosure containing the abovementioned components therein, one end face thereof forming a screen face in which the color phosphor screen is provided.

Operating circuit and details of deflection electrodes are arranged so as to obtain satisfactory displaying of color images, and these arrangements are explained in detail referring to the accompanying drawing.

DESCRIPTION OF THE PREFERRED EMBODIMENTS

Figure 1:
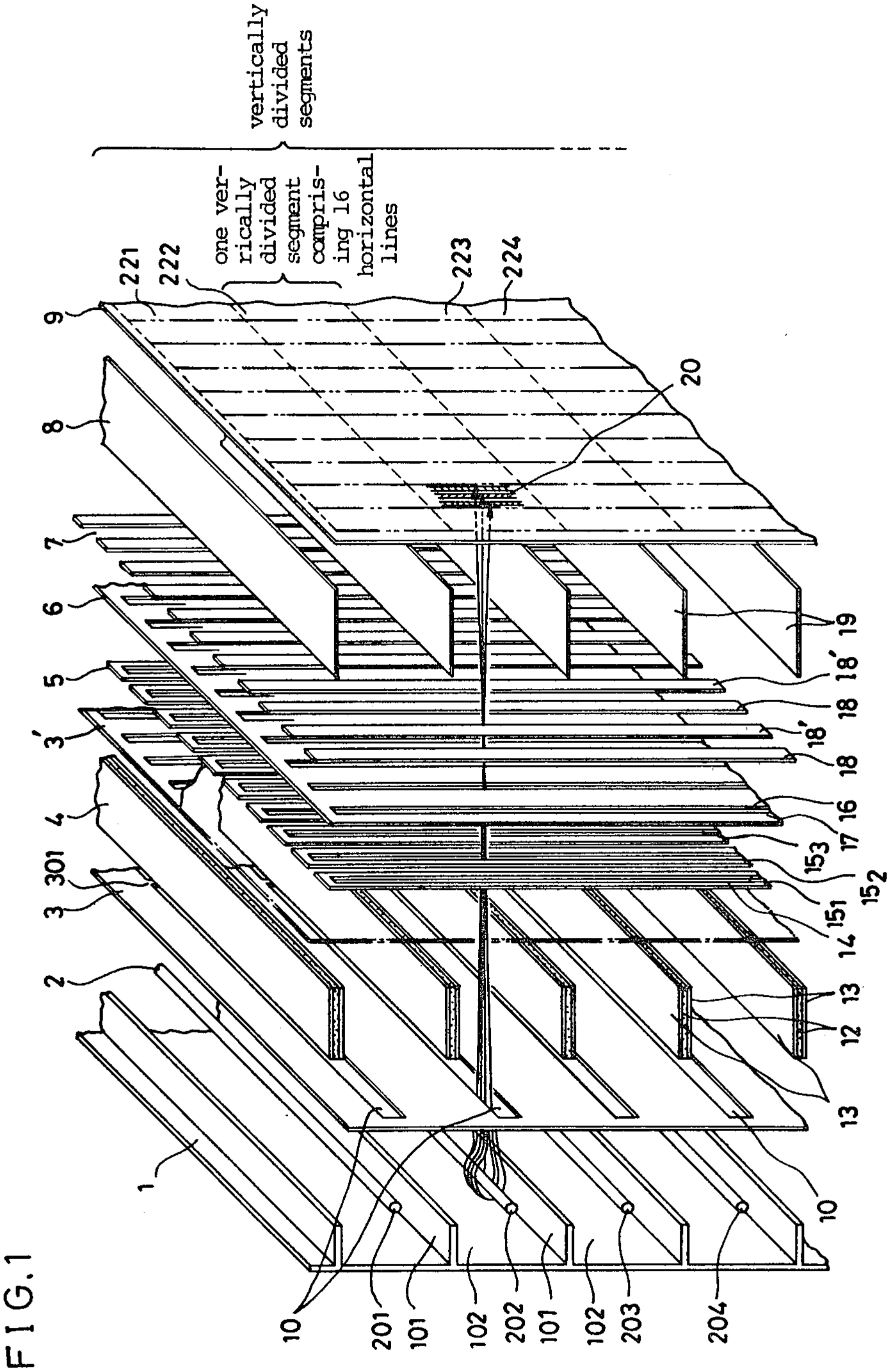
FIG. 1 is an exploded perspective view of a principal part, with its vacuum enclosure removed, of a video image display apparatus embodying the present invention, expanded of its size in the horizontal direction enlarged in comparison with the vertical direction for easier drawing of minute constructions.

One preferred example of the present invention is shown in FIG. 1, wherein from the back part to front part the following components are provided in a flat box shaped evacuated envelope not shown here, but preferably made of glass:

a back electrode 1 having horizontal isolation walls 101, 101 . . . projecting perpendicularly therefrom forming isolated spaces 102, 102 . . . therein, a row of a predetermined number (e.g. 15 in this embodiment) of horizontal line cathodes 201, 202, . . . disposed substantially horizontally in the isolated spaces 102, 102 . . . , a vertical beam focussing electrode 3 having the predetermined number (e.g. 15 in this embodiment) of horizontal slits 10, a first vertical deflection means 4 comprising the predetermined number of pair of vertical deflection electrodes 13', 13 . . . , held by insulator board 12. Each pair of vertical deflection electrodes comprises an upper electrode 13 and a lower electrode 13' both disposed substantially horizontal and defining a deflection space inbetween disposed before the corresponding horizontal slit 10, a second vertical beam-focussing electrode 3' substantially similar to the horizontal beam-focussing electrode 6, a predetermined large number (e.g. 320 for this embodiment) of beam control electrodes 5 consisting of vertical strip electrodes $15_1$, $15_2$ . . . $15_{320}$ each having beam-passing slits 14, 14 . . . disposed with uniform pitch, a horizontal beam-focussing electrode 6 having the predetermined number (e.g. 320 for this embodiment) of vertical slits at positions in front of the slits 14, 14, . . . of the beam control electrodes 5, 5 . . . , a horizontal deflection means 7 comprising the predetermined number (e.g. 320 for this example) of vertical strip electrodes 18, 18', 18, 18' . . . defining the predetermined number (e.g. 320 for this example) of vertically oblong deflection gaps inbetween, a beam acceleration means 8 consisting of a set of horizontally disposed electrodes 19, 19 . . . , and finally a phosphor screen 9, which is ordinarily provided on the inner wall of a front face of the enclosure.

The line cathodes 201, 202 . . . form electron beam source 2, wherein horizontal line cathodes are disposed forming a vertical row, with substantially uniform gaps with each other. In this example, as abovementioned 15 line cathodes 201, 202 . . . 215 are provided, but only four of them are shown. The line cathodes are made by coating a tungsten wire of, for example, 10–20 μm diameter with known electron emitting cathode oxide. All the line cathodes are heated by feeding current thereto, and selective in-turn taking out of horizontal sheet shaped electron beam from selected one of the line cathode is done by changing a potential of the in-turn selected line cathode to negative with respect to the potential of the focussing electrode 3.

The back electrode 1 serves to suppress emissions of electrons from other line cathodes than the selected one and also expel the electrons from the selected cathode to its front direction. The back electrode 1 may be formed by attaching conductive substance such as conductive paint on the inner wall of the back face of the flat type vacuum enclosure. A flat plane shaped cathode may be used in place of the row of the line electrode 201, 202 . . . .

The first vertical beam-focussing electrode 3 have the slits 10 at the position to face the line cathodes 201, 202 . . . and is impressed with a DC voltage, therefore horizontal sheet shaped electron beam from a selected line cathode is formed. The sheet shaped electron beam is then divided into a large number (e.g. 320 in this example) of narrow electron beams by passing through the second vertical beam-focussing electrode 3', the control electrode 5 and horizontal focussing electrode 6. In FIG. 1, only one such narrow electron beam is shown for simplicity. Each slit 10 may have supporting ribs in midway part of the length, or further may consists of a large number (e.g. 320) of openings with very narrow rib parts 301 inbetween.

The electrodes 13, 13' of the vertical deflection means 4 are disposed at levels of substantially the centers between vertically neighboring two horizontal slits 10, 10 of the vertical focussing electrode 3, and a lower electrode 13 and an upper electrode 13' are held on both faces (upper and lower faces) of an insulation board 12. A changing voltage (a vertical deflection signal) is impressed across the pair of upper electrode and lower electrode of each pair thereby forming changing electric field for vertical deflection. In this example, as has been elucidated, by impressing the 16-step changing voltage across the pair electrodes, each electron beam is deflected in a manner to have 16 levels. And the same matter takes place in each of 15 vertically divided segments 221, 222, 223 . . . 235 on the phosphor screen. Accordingly, the phosphor screen 9 has 240 horizontal lines in total (16 lines × 15 segments = 240 lines).

The beam control electrodes 5 comprising 320 strip electrodes $\mathbf{15}_1$, $\mathbf{15}_2$ . . . $\mathbf{15}_{320}$ together with the horizontal beam-focussing electrode 6 divide the horizontal sheet shaped electron beam into 320 rod shaped electron beams, and each strip electrodes $\mathbf{15}_1$, $\mathbf{15}_2$ . . . $\mathbf{15}_{320}$ of the beam control electrodes 5 control intensities of the rod shaped electron beams responding to the information of the video signal. Therefore, the 320 strip electrodes control information of 320 picture elements on each horizontal line. The 320 beam control electrodes receive 320 control signals respectively and controls the 320 rod beams in such a manner as, at one time for red color irradiation, at one time for green color irradiation and at one time for blue color irradiation, in turn. In order to display color picture on the color phosphor screen with the control signals applied to the beam control electrodes, each picture element comprises three elementary color regions, namely red strip region, green strip region and blue strip region, which are disposed in horizontal direction.

The feature of the present embodiment is that all the 320 beam control electrodes $\mathbf{15}_1$, $\mathbf{15}_2$ . . . $\mathbf{15}_{320}$ receive the beam control signals for displaying respective three primary colors, i.e., red and blue or green, at a same time. That is, at one moment, one horizontal line on the phosphor screen displays an image of red color parts and blue color parts of the line by impingements of red phosphor regions by odd number electron beams and impingements of blue phosphor regions by even number electron beams, at the next moment an image of green color part of the line, and at the next moment an image of red color parts and blue color part of the line by impingements of red color phosphors regions by even number electron beams and impingements of blue color phosphor regions by odd number electron beams. In this apparatus, the odd number electronic switches $\mathbf{35}_1$, $\mathbf{35}_3$, $\mathbf{35}_5$ . . . $\mathbf{35}_{15}$ switch to feed signal in the order of R, G and B, and the even number electronic switches $\mathbf{35}_2$, $\mathbf{35}_4$ . . . $\mathbf{35}_{14}$ switch in the order of B, G and R.

The horizontal beam-focussing electrode 6 is impressed with a DC voltage and focusses the rod shaped electron beams in horizontal direction.

The horizontal deflection means 7 comprises strip electrodes 18, 18' . . . which are disposed at the positions in front of center positions between neighboring slits 16, 16 of the horizontal beam-focussing electrode 6. Each of the strip electrodes pair 18, 18' is impressed with 3-level changing voltage or a horizontal deflection signal, and horizontally deflects rod shaped electron beams, thereby making the rod shaped electron beams selectively impinge red phosphor regions, green phosphor regions or blue phosphor regions in turn.

In the example, where a horizontal row of 320 rod shaped electron beams impinge 320 sets of three primary color regions, one horizontal deflection range corresponds to one horizontal picture element width.

The horizontally disposed electrodes of the beam-acceleration means 8 are dispose at the height level corresponding to those of the composite body of vertical deflection electrodes 13 and 13' and are impressed with a DC voltage.

The phosphor screen 9 may be provided with known metal back layer (not shown) formed on the side of cathodes and a positive DC voltage is impressed thereon. In practical example, the phosphor regions are formed vertically oblong strips of red color phosphor, green color phosphor and blue color phosphor. In FIG. 1, horizontal broken lines on the phosphor screen 9 show boundary lines between neighboring vertically divided segments to be impinged by electron beams of respective line cathodes. Vertical chain lines on the phosphor screen 9 shown boundary lines between horizontally neighboring sets of three primary color phosphor strips.

Figure 2:
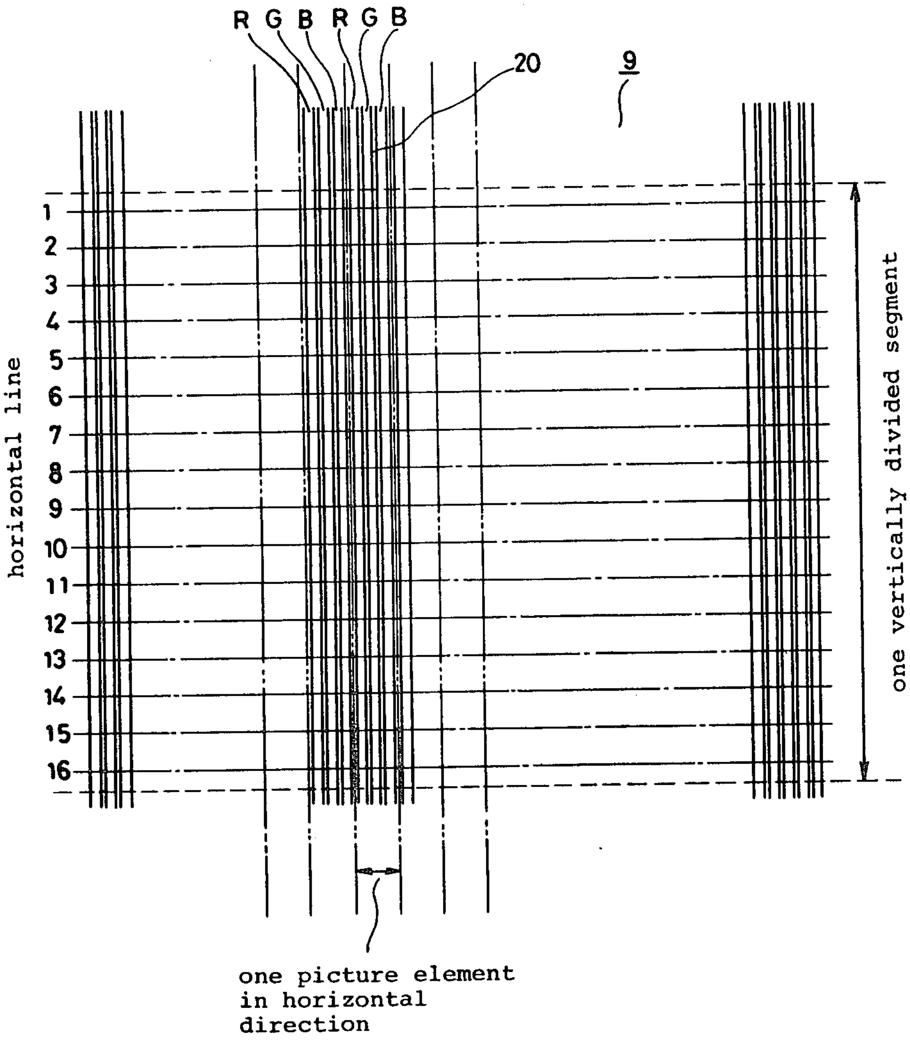
FIG. 2 is a schematic front view of a phosphor screen of the apparatus of FIG. 1.

A small segment 20, which is defined by two neighboring vertical chain lines and two neighboring horizontal broken lines, is shown enlarged in schematic view of FIG. 2, wherein the small segment 20 has 16 horizontal lines in vertical row. In an actual example, one segment has the size of 16 mm high in vertical direction and 1 mm width in horizontal direction, and in FIG. 1 the sizes are shown enlarged in widthwise direction as has been mentioned.

Apart from the above-mentioned example where 320 sets of three primary color phosphor regions are formed widthwise of the phosphor screen for 320 rod shaped electron beams produced by 320 slits 14 of the beam-control electrode 5 and 320 slits 16 of the horizontal beam-focussing electrode 6, such a modification may be made that for the 320 sets of three primary color phosphor regions, 160 rod-shaped electron beams are provided, and in this case the horizontal deflection signal is 6-level changing voltage which deflects the rod-shaped electron beam to sweep for the horizontal range of the color phosphor regions of RGBRGB, and each of the beam-control electrodes 5 also receives the control signal for two picture elements in sequence.

Figure 3:
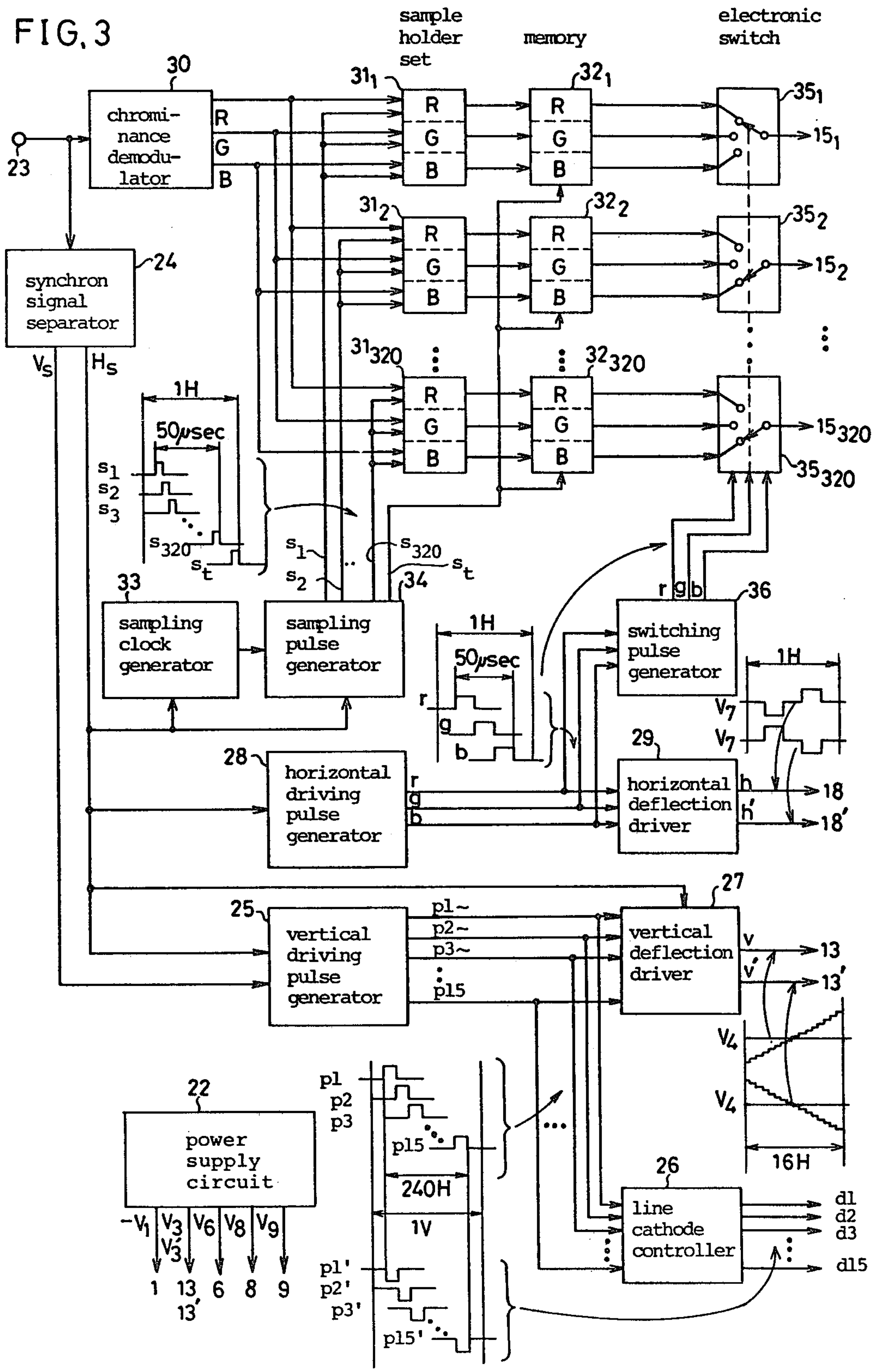
FIG. 3 is a circuit block diagram showing a fundamental electric construction of the apparatus of FIG. 1.

FIG. 3 shows a circuit block diagram of a fundamental electric construction of the apparatus of FIG. 1. The explanation starts from the part to drive tne cathode ray tube to form a raster on its phosphor screen.

A power supply 22 is for impressing necessary voltages on various electrodes of the flat cathode ray tube of FIG. 1. The following DC voltages are supplied to the electrodes:

$-V_1$ to back electrode 1,
$V_3$ to vertical beam-focussing electrode 3,
$V_3'$ to vertical beam-focussing electrode 3',
$V_6$ to horizontal beam-focussing electrode 6,
$V_8$ to acceleration electrode 8,
$V_9$ to phosphor screen 9.

An input terminal 23 receives ordinary composite video signal and give it to a synchronizing signal separator 24 and to a chrominance demodulator 30. The synchronizing signal separator 24 separate and issues vertical synchronizing signal $V_s$ and horizontal synchronizing signal $H_s$. A vertical driving pulse generator 25 comprises a counter which count the horizontal synchronizing signal $H_s$ and is reset by the vertical synchronizing signal $V_s$, and issues 15 driving pulses p1, p2, p3 . . . p15, each having duty time of 16 H (1 H is the time period for one horizontal scanning). The fifteen pulses p1 to p15 are issued during an effective vertical sweep period, which is the time length of one vertical sweep period exclusive of vertical fly-back time and is of 240 H time length. The driving pulses are then given to the line cathode controller 26, where they are inversed of polarity to produce pulses p1', p2', p3' . . . p15' falling down to OV at respective inversed peak period (of 16 H length) and retaining 20 V for other period, and is fed to respective line cathodes 201, 202, 203 . . . 215. The line cathodes are always heated by a small voltage DC current so as to be able to emit electrons at any time, and the electrons are taken out, when the pulse of a selected line cathode is at its peak (OV), by means of positive electric field towards the vertical beam-focussing electrode 3 and subsequent other electrodes. For period other than the peak (OV) of the pulses impressed on a line cathode, because of negative electric field formed by impression of +20 V thereon, the line cathodes do not emit electron beam. That is, one of the 15 line cathodes in turn emit electrons beams. Therefore, the line cathodes are activated in turn from the top one 201 to the bottom one 215 each for 16 H time period. The emitted electrons are driven forward to the vertical beam-focussing electrodes 3, 3' and focussed to form a horizontal sheet-shaped electron beam.

A vertical deflection driver 27 comprises a counter for counting horizontal synchronizing signal $H_s$ and is reset by the output pulses p1, p2 . . . p15 of the vertical driving pulse generator 25 and an A/D converter for A/D converting the count output. And the vertical deflection driver 27 issues a pair of vertical deflection signals v, v', which are 16-step rising sawtooth wave and 16-step falling sawtooth wave, respectively, both having center voltage of $V_4$. These vertical deflection signals v and v' are impressed on the upper vertical deflection electrodes 13 and the lower vertical deflection electrodes, respectively. Accordingly, the sheet shaped electron beams are vertically stepwisely deflected in 16 steps and repeat the same. And therefore, a hozrizontal line displayed on the phosphor screen stepwisely falls from top position to bottom position in 16 steps in one vertically divided segment 221, 222 . . . or 235 of FIG. 1.

Since the activation of the line cathodes is stepwisely shifted one by one downward every 16 H time period, when the horizontal line on the phosphor screen comes down and arrives at the bottom of the first vertically divided segment 221, the next moving of the horizontal line on the phosphor screen starts from the top position of the second vertically divided segment 222, and the similar downward shifting of the horizontal line proceeds until the horizontal line arrives at the bottom of the 15th (lowest) vertically divided segment 235, and the horizontal line goes back to the top of the first segment 221. That is, the vertical deflection of the horizontal line continuously proceeds from the top (No. 1 horizontal line) to the bottom (No. 240, i.e., (15×16)th) of the phosphor screen 9, thereby forming a raster of 240 horizontal lines.

The sheet-shaped electron beam is then divided into 320 rod-shaped electron beams having substantially round sections when passing through the vertically oblong slits 14, 14 . . . of the beam-control electrode $\mathbf{15_1}$, $\mathbf{15_2}$ . . . and vertically oblong slits 16, 16 . . . of the horizontal beam-focussing electrode 6. The rod-shaped electron beams are controlled of their currents by means of voltage impressed on respective strip electrodes of the beam-control means 5, and further deflected by horizontal deflection means 7 so as to have one of three positions corresponding to R, G and B regions of the phosphor screen 9 by means of the horizontal deflection signals given by the horizontal deflection driver 29.

A horizontal driving pulse generator 28 comprises three stages of sequentially connected monostable multivibrators, the first stages of which is triggered by horizontal synchronizing signal $H_s$. And the horizontal driving pulse generator issues three pulses r, g and b of the same pulse widths. For one example, an effective horizontal scanning period of 50μ sec. is divided into 3 periods for the pulses r, g and b, accordingly, the pulses, r, g and b have 16.7μ sec. pulse width each. The horizontal driving pulses r, g and b are given to the horizontal deflection driver 29, which is switched by the horizontal driving pulses r, g and b and issues a pair of horizontal deflection signals h and h'. These horizontal deflection signals h and h' are three step rising signal and three step falling signal, respectively, and, both have the same center voltage $V_7$. These horizontal deflection signals h and h' are given to the horizontal deflection electrodes 18, 18, 18 . . . and 18', 18', 18' . . . dispose alternately in the horizontal deflection means 7. As a result, 320 rod-shaped electron beams are deflected at the same time to R, G or B regions on a same horizontal line of the phosphor screen.

It should be noted that in the construction shown in and explained referring to FIG. 1, the number of strip electrodes 18, 18' . . . of the horizontal electrodes are 320 for the 320 rod-shaped electron beams, and the strip electrodes 18, 18' . . . are alternately connected to the output terminals h and h' of the horizontal deflection driver. Accordingly, the electric fields of horizontal deflection gaps defined by neighboring two strip electrodes 18 and 18' are not of the same direction. Namely, the directions of electric field of the horizontal deflection gaps are alternatingly opposite each other for neighboring horizontal deflection gaps. The effect of this alternatingly opposite electric field is compensated as will be elucidated later.

Thus, the horizontal line on the phosphor screen at one time displays red image at the same time, at the next time green image at the same time and at the next time blue image at the same time, and at the next time the line proceed to the next lower line whereon the same is repeated.

The beam intensity control is made as follows:

The input composite video signal received at the input terminal 23 is given to the chrominance demodulator 30 where color differential signals R-Y and B-Y are demodulated and G-Y is also produced by known matrix circuit therein, and by processing these color differential signals with a luminance signal Y, primary color signals R, G and B are produced. The primary color signals R, G and B are given to 320 sets of sample-hold means $31_1$, $31_2$ . . . $31_{320}$, each comprising three elementary sample-hold circuits for R, G and B color signals. The output signals of the 960 elementary sample-hold circuits are given to 320 sets of memory means $32_1$, $32_2$ . . . $32_{320}$, each comprising three memories for R, G and B color signals.

On the other hand a sampling clock generator 33 comprises PLL (phase locked loop) circuit, and issues sampling clock pulses of 6.4 MHz, which is controlled to have a predetermined phase difference against the horizontal synchronizing signal $H_s$. The sampling clock pulses are given to the sampling pulse generator 34, wherein by means of, for example, a shift register of 320 stages, 320 sampling pulses $S_1$, $S_2$ . . . $S_{320}$, each having phase difference by 50μ sec/320 time inbetween, are produced and given to the sample hold circuits $31_1$, $31_2$ . . . $31_{320}$, respectively. After the last sampling pulse $S_{320}$, a transferring pulse $S_t$ is issued from the sampling pulse generator 34 to the memories $32_1$, $32_2$ . . . $32_{320}$. The sampling pulses $S_1$, $S_2$ . . . $S_{320}$ correspond to 320 picture elements in the horizontal direction on the phosphor screen 9, and their timings are controlled so as to have a constant relation with respect to the horizontal synchronizing signal $H_s$. By impressing the 320 sets of sampling pulses to respective 320 sets of sample-hold circuits, the sample-hold circuits $31_1$, $31_2$ . . . $31_{320}$ sample and hold R, G and B information of video signals therein. After finishing of the sample-hold for one horizontal line, upon receipt of the transfer signal $S_t$ by the memories, the sample-held informations are transferred at one time to the memories $32_1$, $32_2$ . . . $32_{320}$, and retained there for the next one horizontal scanning period ($H = 63.5\mu$ sec).

The R, G and B information of the video signal for the one horizontal line stored in the memories $32_1$, $32_2$ . . . $32_{320}$ are led to 320 electronic switches $35_1$, $35_2$ . . . $35_{320}$, which are electronics switches comprising analog gate circuits for selectively leading the stored signals of a color R, G or B to the respective strip electrodes $15_1$, $15_2$ . . . $15_{320}$ of the beam control means 5. The switching ciricuits $35_1$, $35_2$ . . . $35_{320}$ are simultaneously switched, being controlled by switching pulses given from a switching pulse generator 36, which is controlled by the output pulses r, g and b of the horizontal driving pulse generator 28. The electronic switches $35_1$, $35_2$ . . . $35_{320}$ switch every 16.7μ sec (=50μ sec/3) for selectively leading the video signal information of R, G and B color in turn each for 16.7μ sec.

In the switching, the switching circuits of the odd number orders are switched in the order of R→G→B while the switching circuits of the even number orders are switched in the order of B→G→R, so that the effect of the alternatingly opposite directed electric fields produced by the horizontal deflection means 7 is compensated.

Hereupon it should be noted that timing (phases) of the switchings of the electronic switches $35_1$, $35_2$ . . . $35_{320}$ and the horizontal deflection driver 29 should be completely synchronized with each other, in order to avoide poor color impurity caused by undesirable mixing of a color signal with other color signals.

As a result of the operation as has been elucidated, the phosphor screen displays red color image of one horizontal line at one time, followed by green color image of the horizontal line at one time and further followed by blue color image of the horizontal line at one time, and then the same displaying is made proceeding to the next (lower) line, and thus displaying of one field having 240 horizontal lines is completed. And the displayings of the fields are repeated and television picture is obtainable on the phosphor screen 9.

In case the number of picture elements on one horizontal line is selected twice or three times of the number of rod shape electron-beams each individually controlled by independent beam control electrodes $15_1$, $15_2$, . . . , the number of the above-mentioned sample-hold circuits must be increased twice or three times, to the number of the picture elements on the line, and relevantly, the numbers of the memories should also be increased to the same number. And each electronic switch should selectively connect the outputs of the increased number of memories time sharingly to the corresponding beam-control electrodes.

The primary colors of the phosphor regions are not necessarily limited to the combination of the R, G and B, but any other combination as the primary color of phosphors may be usable.

In the above-mentioned description, the words "horizontal" and "vertical" are used to imply that "horizontal" is the direction that the lines are displayed on the phosphor screen, and "vertical" is the direction that the displayed line is shifted to the next line to form a raster, and accordingly these words are not bound to the absolute spatial relation of the screen.

The above-mentioned apparatus can provide a color television apparatus of very flat and compact type, and a sufficiently bright and clean display image is ensured since known combination of the color phosphors and cathode ray beams is used.

The embodiment apparatus may comprise a measure to eliminate undesirable effects caused from inaccurate construction of the deflection electrode or the like, which is likely to results in a nonuniformity of gap between horizontal lines or non parallelness of the horizontal lines, leading to unpleasant distorted video picture displaying.

Figure 4:
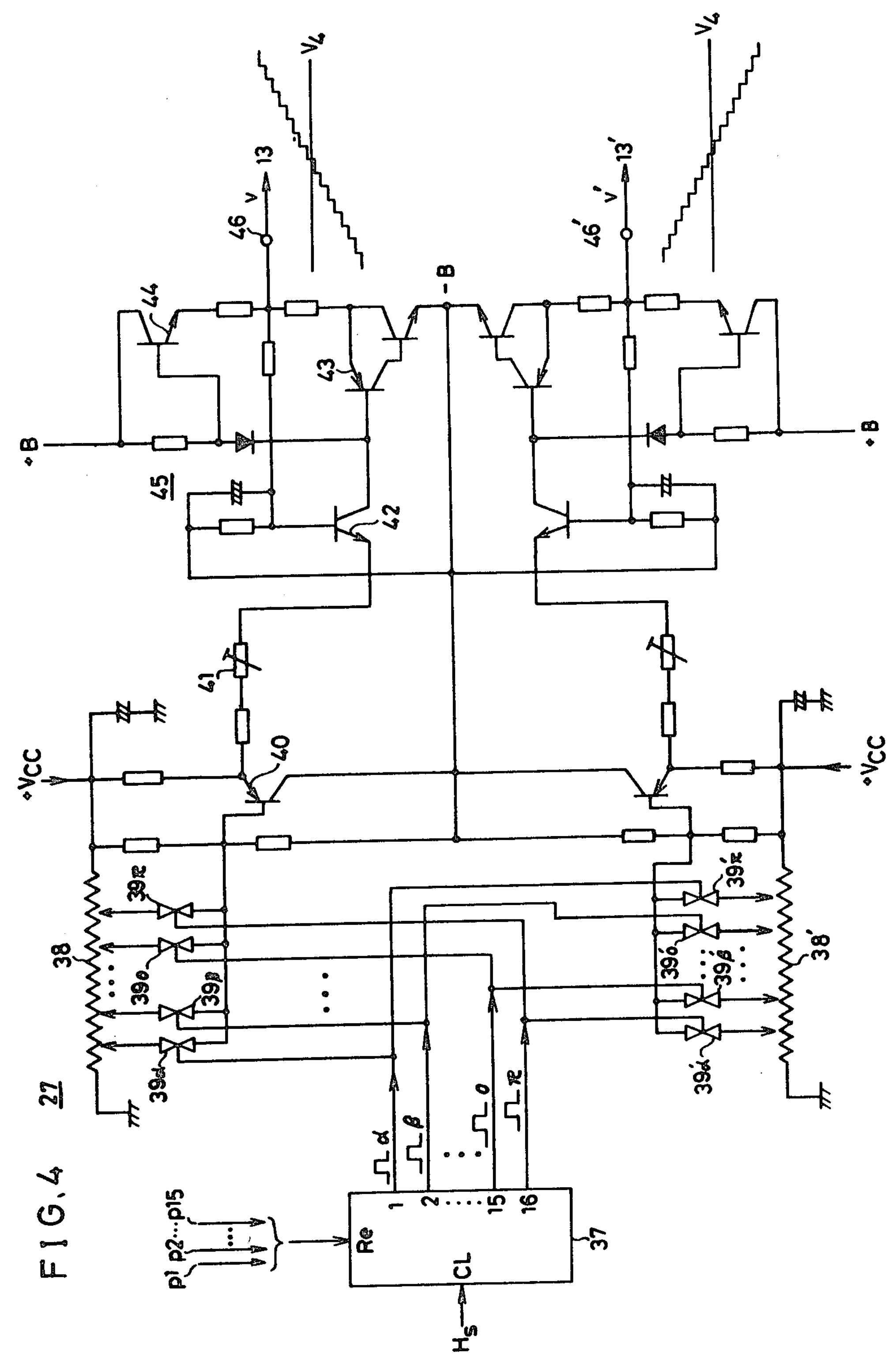
FIG. 4 is a circuit diagram showing an example of a vertical deflection driver 27.
Figure 5:
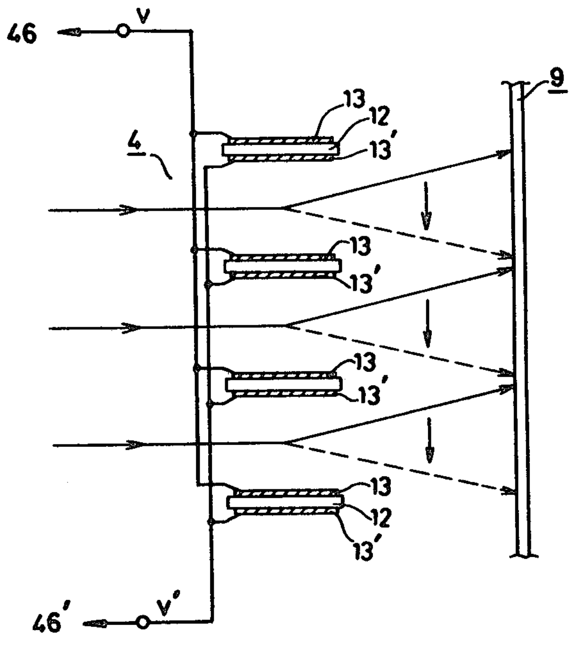
FIG. 5 is a schematic side view showing a relation between vertical deflection electrodes and phosphor screen.

FIG. 4 shows a representative example of the vertical deflection driver 27. A ring-counter 37 is reset by rising edges of the vertical driving pulses p1, p2 . . . p15 from the vertical driving pulse generator 25, counts the horizontal synchronizing signals H and issues output signals $\alpha$, $\beta$, $\gamma$ . . . o and $\pi$ from its 16 output terminals. On the other hand, a potentiometer 38 has 16 intermediate output terminals, through which 16 output voltages of different levels are taken out and given to the analog switches $39_\alpha$, $39_\beta$ . . . $39_\pi$, respectively. These analog switches are controlled by the above-mentioned signals $\alpha$, $\beta$, $\gamma$ . . . $\pi$, in a manner to be made conductive each for 1 H time period in different timing sequence. Therefore, at the common connected output-terminal of the analog switches $39_\alpha$, $39_\beta$ . . . $39_\pi$, a stepwise rising output having 16 step voltage levels is obtainable. The stepwise output is taken out through an emitter follower 40, adjusted of amplitude by the variable resistor 41, amplified by a B-class amplifier 45 constituted by transistors 42, 43 and 44, and issued as the vertical deflection signal v through an output terminal 46. On the other hand, the vertical deflection signal v' is issued through the output terminal 46' in the similar manner, by switching the voltages of the potentiometer 38' by the analog switches $39'_\alpha$, $39'_\beta$ . . . $39'_\pi$. As shown in FIG. 5, the vertical deflection signals v and v' are impressed to the upper vertical deflection electrodes 13', 13' . . . and the lower vertical deflection electrodes 13, 13 . . . , and thereby the electron beams from a line cathode is vertically deflected to have 16 vertical positions, thereby forming 16 horizontal lines on the phosphor screen 9.

Figure 6:
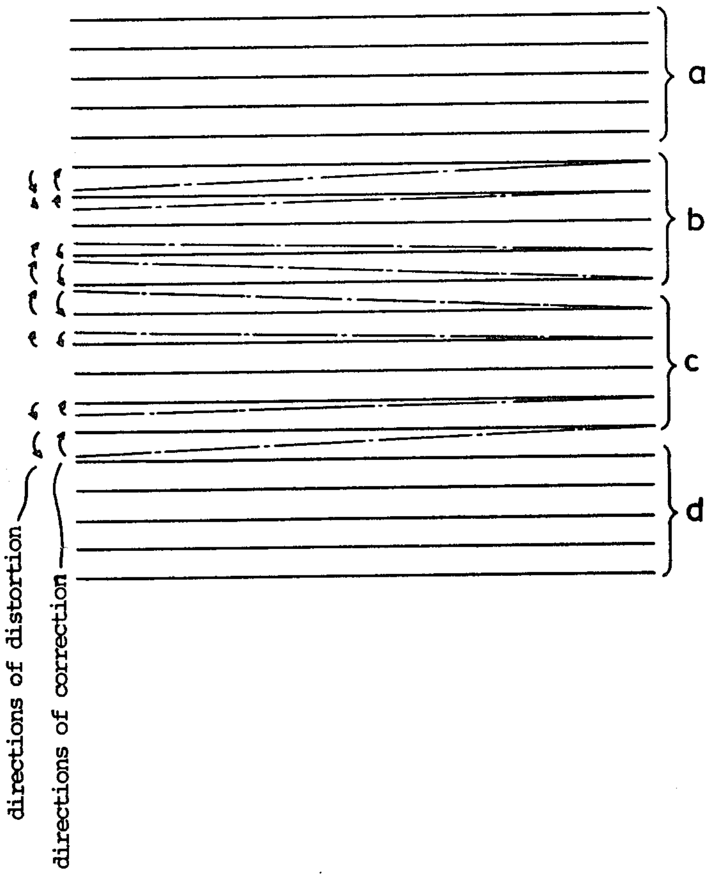
FIG. 6 is a schematic front view of a displayed raster on the phosphor screen for illustrating error and correction of the horizontal lines on the raster.
Figure 7:
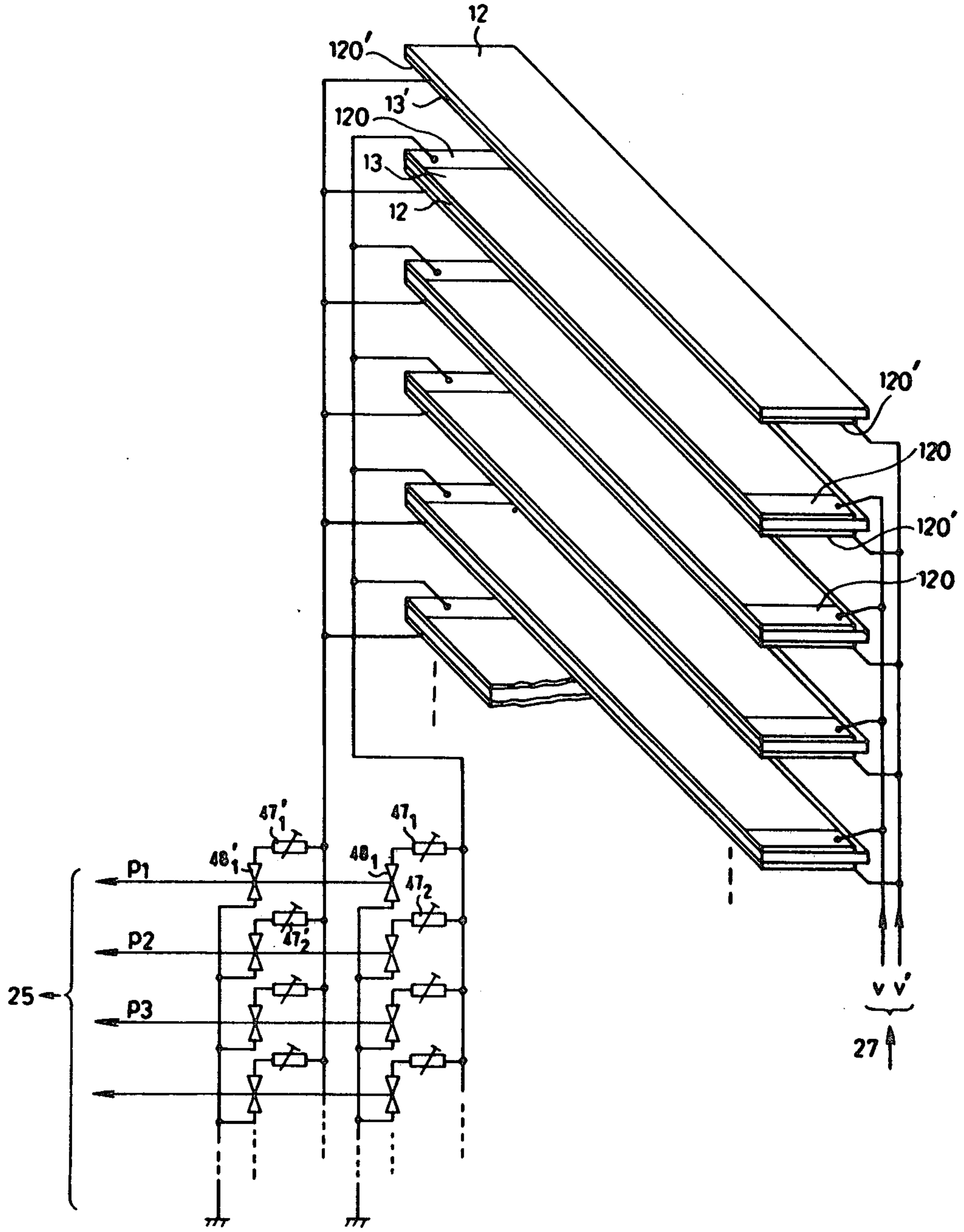
FIG. 7 is a perspective view showing a part of a modified example of a vertical deflection electrodes of the apparatus.

Hereupon, when mounting of the electrodes 13, 13' of the vertical deflecting means 4 is not accurate, making them non-parallel with each other, or tilted with respect to plan view, then the horizontal lines of the raster does not become parallel and uniform, accordingly for example making the lines partly non-uniform or partly tilted. FIG. 6 exemplarily shows such states of the raster, wherein solid lines show ideal positions of the horizontal lines and chain lines show states of slipping of the horizontal lines. The parts "a" and "d" show the state that lines are uniform and parallel. In the part "b", the line gaps shrink in the left part. In the part "c" the line gaps expands in the left part. FIG. 7 shows a circuit for enabling corrections of such one side shrinkage and expansion of the line gap. In this example, the strip electrodes 13 and 13' of the vertical deflection means are formed by sheet resistors, and connecting electrodes 120 and 120' are formed on both end parts thereof. The vertical deflecting signals v and v' are impressed on the connecting electrodes on the ends of one sides, and connecting electrodes on the ends of the other side are grounded through series connections of variable resistor and analog switch $47_1+48_1$, $47_2+48_2$ . . . $47_{15}+48_{15}$ and $47'_1+48'_1$, $47'_2+48'_2$ . . . $47'_{15}+48'_{15}$, and the control electrodes of the analog switches $48_1$, $48_2$ . . . $48_{15}$ and $48'_1$, $48'_2$ . . . $48'_{15}$ are connected to the output terminals of the vertical driving pulse generator 25. In the above-mentioned construction, by adjusting the variable resistors $47_1$, $47_2$ . . . $47_{15}$ and $47'_1$, $47'_2$ . . . $47'_{15}$, the amplitude of the vertical deflection signal at a desired end part can be adjusted, thereby forming tapered voltage distributions on the sheet resistor and hence tapered electric fields in the gap space between a pair of vertical deflection electrodes 13, 13'. In order to make desired correction of shrinking or expansion of either side of the raster, the connections of the left ends and the right ends may be exchanged. It is of course necessary that the adjustment should be made without losing balance between the adjustment of the deflection signal for the upper deflection electrodes 13' and that for the lower deflection electrodes 13.

As a result of the above-mentioned arrangement, even when distortions of parallelism between horizontal lines in the raster due to the causes of dimensional errors in assembling or mounting of the vertical deflection electrode 4 happens to take place, it is possible to correct horizontal lines in the raster to the right positions as they are designed, by means of the adjustments of the voltage distributions in the sheet resistors of the vertical deflection electrodes. Thus, a distortion free video image is obtainable.

Furthermore, the means for independent adjustments of the voltage distribution of the vertical deflection means is not necessarily limited to the constitution as elucidated referring to FIG. 7, but any other circuit of the same or similar function may be applicable. Instead of the sheet resistors 13 and 13', wires of a suitable high resistance material may be of course used. Besides, the positions where the adjustment means are to be coupled to may be arbitrarity selected within a range to obtain the function.

Since the adjusting means elucidated referring to FIG. 7 can correct the distortion or irregularity of the horizontal line in any regional parts of the raster, the conventional problem of the flat type multi line-cathode color television tube such as of liability of nonuniformity or irregularity distortion of horizontal lines in the raster can be fairly easily overcome, thus making the flat color tube practically usable by enabling to display high quality color picture.

What is claimed is:

1. A color image display apparatus comprising:

a color phosphor screen comprising a first predetermined number of horizontally divided sections each comprising a set of regions of primary color phosphors, an electron beam source for in-turn emitting a second predetermined number of horizontal rows of electron beams, each row having said first predetermined number of electron beams, producing one horizontal line on said color screen, a horizontal deflection means for selective impingements of said electron beams on said regions in turn selected corresponding kinds of primary color phosphors at one time, in turn changing colors of said horizontally divided sections, a vertical deflection means for vertically deflecting said electron beams in such a manner that electron beams of a horizontal row impinges said phosphor screen in one vertically divided segment which is corresponding to said one horizontal row, thereby vertically moving said one horizontal row, thereby vertically moving said one horizontal line in said vertically divided segment, an electron beam control means for simultaneous controlling of intensities of respective electron beams responding to a color video signal for said selected kind of primary color, to produce a line-at-a-time displaying of a color video picture, a flat shaped vacuum enclosure containing the above-mentioned components therein, one end face thereof forming a screen face in which said color phosphor screen is provided, and said electron beam control means comprising a sample-hold means for sample-holding color video signals, corresponding to said horizontally divided sections, and a memory for storing output signals of said sample-hold means and electronic-switch means each for feeding a signal of an in-turn selected primary color out of said stored output signals at one time to said electron beam control means, to produce said line-at-a-time displaying.

2. A color image display apparatus in accordance with claim 1, wherein said electron beam source comprises said second predetermined number of line cathodes, which are provided for respective vertically divided segments.

3. A color image display apparatus in accordance with claim 1, wherein said vertical deflection means comprises at least a pair of vertical deflection electrodes formed with strip shaped sheet resistors or wires, and a circuit means for impressing vertical deflection signals on ends of said vertical deflection electrodes on one side and forming voltage differences across the longitudinal direction of the vertical deflection electrode, to form different electric field distributions for different vertically divided segments.

4. A color image display apparatus in accordance with claim 3, wherein said circuit means comprises a mean for impressing vertical deflection signals on ends on one side of said vertical deflection electrodes and for impressing adjusted voltages through voltage-adjusting circuits on ends on the other side of said vertical deflection electrodes.

5. A color image display apparatus in accordance with claim 3, wherein said circuit means comprises variable resistors connected to ends of said vertical deflection electrodes.

6. A color image display apparatus in accordance with claim 1, wherein said vertical deflection means comprises at least a pair of vertical deflection electrodes formed with strip shaped sheet resistors or wires, and a circuit means for impressing vertical deflection signals on ends of said vertical deflection electrodes on one side and forming voltage differences across the longitudinal direction of the vertical deflection electrode, to form different electric field distributions for different vertically divided segments.

7. A color image display apparatus in accordance with claim 6, wherein said circuit means comprises a means for impressing vertical deflection signals on ends on one side of said vertical deflection electrodes and for impressing adjusted voltages through voltage-adjusting circuits on ends on the other side of said vertical deflection electrodes.

8. A color image display apparatus in accordance with claim 1, wherein said vertical reflection means comprises variable resistors connected to ends of said vertical deflection electrodes.

9. A color image display apparatus comprising:

a color phosphor screen comprising horizontally divided sections each further having horizontally subdivided regions of red phosphor, green phosphor and blue phosphor, an electron beam source for emitting respective rows of electron beams in turn corresponding to vertically divided sections of said phosphor screen, vertical deflection electrodes for displaying several lines in each of said vertically divided sections of said phosphor screen by vertically deflecting corresponding one of said row of electron beams, horizontal deflection electrodes for horizontally deflecting said electron beams in respective horizontally divided sections, thereby making the electron beams impinge horizontally divided primary color phosphor regions in turn, electron beam control means for controlling amounts of respective electron beams impinging said phosphor screen responding to an input video signal, thereby to display a video image on the phosphor screen, and said electron beam control means comprising a sample-hold means for sample-holding color video signals, corresponding to said horizontally divided sections and a memory for storing output signals of said sample-hold means and electronic-switch means each for feeding a signal of an in-turn selected primary color out of said stored output signals at one time to said electron beam control means, to produce said line-at-a-time displaying.

* * * * *